United States Patent [19]

Noya et al.

[11] Patent Number: 5,315,602
[45] Date of Patent: May 24, 1994

[54] OPTIMIZED STRIPE DETECTION FOR REDUNDANT ARRAYS OF DISK DRIVES

[75] Inventors: Eric S. Noya, Groton; Randy M. Arnott, Clinton; Mitchell N. Rosich, Groton, all of Mass.

[73] Assignee: Digital Equipment Corporation, Maynard, Mass.

[21] Appl. No.: 929,076

[22] Filed: Aug. 12, 1992

[51] Int. Cl.⁵ .............................................. G06F 11/10
[52] U.S. Cl. ................................. 371/40.4; 371/10.1; 395/575
[58] Field of Search ................... 371/10.1, 21.1, 40.1, 371/40.2, 40.4; 395/400, 425, 575

[56] References Cited

U.S. PATENT DOCUMENTS

| | | |
|---|---|---|
| 4,437,155 | 3/1984 | Sawyer et al. |
| 4,489,378 | 12/1984 | Dixon et al. |
| 4,636,946 | 1/1987 | Hartung et al. |
| 4,882,642 | 11/1989 | Tayler et al. |
| 4,972,316 | 11/1990 | Dixon et al. |
| 4,972,364 | 11/1990 | Barrett et al. |
| 5,109,485 | 4/1992 | Smith, Jr. |
| 5,109,500 | 4/1992 | Iseki et al. |
| 5,263,145 | 11/1993 | Brady et al. ......................... 395/425 |
| 5,274,799 | 12/1993 | Brant et al. ......................... 395/575 |

OTHER PUBLICATIONS

"A Case for Redundant Arrays of Inexpensive Disks (RAID)", Patterson et al., Computer Science Div., (EECS), U. of California, Berkeley, Calif. 94720.

*Primary Examiner*—Vincent P. Canney
*Attorney, Agent, or Firm*—Albert P. Cefalo; Dirk Brinkman

[57] ABSTRACT

A system for reducing the number of I/O requests required to write data to an redundant array of inexpensive disks (RAID) of a computer system including a host central processor unit and a memory buffer cache. The system includes determinations for writing new data stored in the cache to the disk drives, as stripes, using the least number of I/O requests possible. The system uses the best of two alternative techniques in which the parity for the stripe can be generated. A first procedure determines the number of I/O requests that would be required to generate the parity data from the entire stripe including the new data to be written to the disk drives. A second procedure determines the number of I/O requests that would be required to generate the parity data from the new data to be written to the disk drives and the old parity data of the stripe. The system then aggregates in memory the blocks necessary to generate the parity data as either an entire stripe or as individual blocks using the technique which requires the least number of I/O requests as determined by the first and second procedures.

10 Claims, 5 Drawing Sheets

OPTIMIZED STRIPE DETECTION FOR REDUNDANT ARRAYS OF DISK DRIVES

FIELD OF THE INVENTION

This invention relates to the control of multiple disk drives for use with a computer system, and more particularly to a system for writing data to multiple disk drives.

BACKGROUND OF THE INVENTION

It is a problem in the field of computer systems to provide an inexpensive, high performance, high reliability, and high capacity disk storage device. Traditional high performance and high capacity disk devices have typically used single large expensive disks (SLED) having form factors in the range of 12 or 14 inches.

The rapid acceptance of personal computers has created a market for inexpensive small form factor drives, such as 5¼, 3½ inch, or smaller. Consequently, a disk storage device comprising a redundant array of inexpensive disks (RAID) has become a viable alternative for storing large amounts of data. Raid products substitute many small disk drives for a few very large expensive drives to provide higher storage capacities and throughput.

Striping is one well known technique used with RAID to improve I/O throughput. Striping involves the concurrent transfer of data to an array of disk drives in "stripes." For example, if the RAID has five disk drives, a stripe would consist of five blocks of data, and one block is transferred from each of the disk drives. In a five disk RAID, a data can typically be processed in about 1/5 the amount of time by transferring one block of data to each of the disk drives concurrently.

The drawback to replacing a single large disk drive with several small disks is reliability, since there is a much higher probability that one of the disk drives in the array will fail making the array inoperable. However, by means of data redundancy techniques, the reliability of RAID products can be substantially improved. Raid products typically use parity encoding to survive and recover from disk drive failures. Different levels of RAID organizations using parity encoding are currently known, see "A case for redundant arrays of inexpensive disks" David A. Patterson et al., Report No. UCB/CSD 87/891, December 1987, Computer Science Division (EECS), Berkeley, Calif. 94720. In RAID levels 4 and 5, one block of a stripe is reserved for parity data. RAID level 4 stores all parity blocks on the same drive, RAID level 5 distributes the parity blocks over all of the drives in the array.

Parity data are generally generated by using an exclusive or (XOR) function. RAID parity protection suffers from inherent problem that the number of I/O requests that must be serviced to maintain the parity data are many more than would be the case with non-RAID disks not using parity protection. For example, to write a block of new data to disk, the following steps must be performed: a) read the block storing the old data from the disk; b) read the block storing the old parity data from the disk) generate new parity data from the old data, the old parity data, and the new data; d) write the block storing the new data; and e) write the block storing the new parity data. In other words, the writing of a block of data in traditional RAID products typically requires four times the number I/O requests than would be the case with non-RAID disks.

Therefore, it is desirable to provide a system which reduces the number of I/O requests required to maintain parity data for the stripes of a RAID product.

SUMMARY OF THE INVENTION

The present invention provides a system for reducing the number of I/O requests required to write data to an redundant array of inexpensive disks (RAID) of a computer system including a host central processor unit and a memory buffer cache. The system includes determinations for writing new data stored in the cache to the disk drives, as stripes, using the least number of I/O requests possible. The system uses the best of two alternative techniques in which the parity for the stripe can be generated. A first procedure determines the number of I/O requests that would be required to generate the parity data from the entire stripe including the new data to be written to the disk drives. A second procedure determines the number of I/O requests that would be required to generate the parity data from the new data to be written to the disk drives and the old parity data of the stripe. The system then aggregates in memory the blocks necessary to generate the parity data as either an entire stripe or as individual blocks using the technique which requires the least number of I/O requests as determined by the first and second procedures.

DETAILED DESCRIPTION OF THE PREFERRED EMBODIMENT

Figure 1:
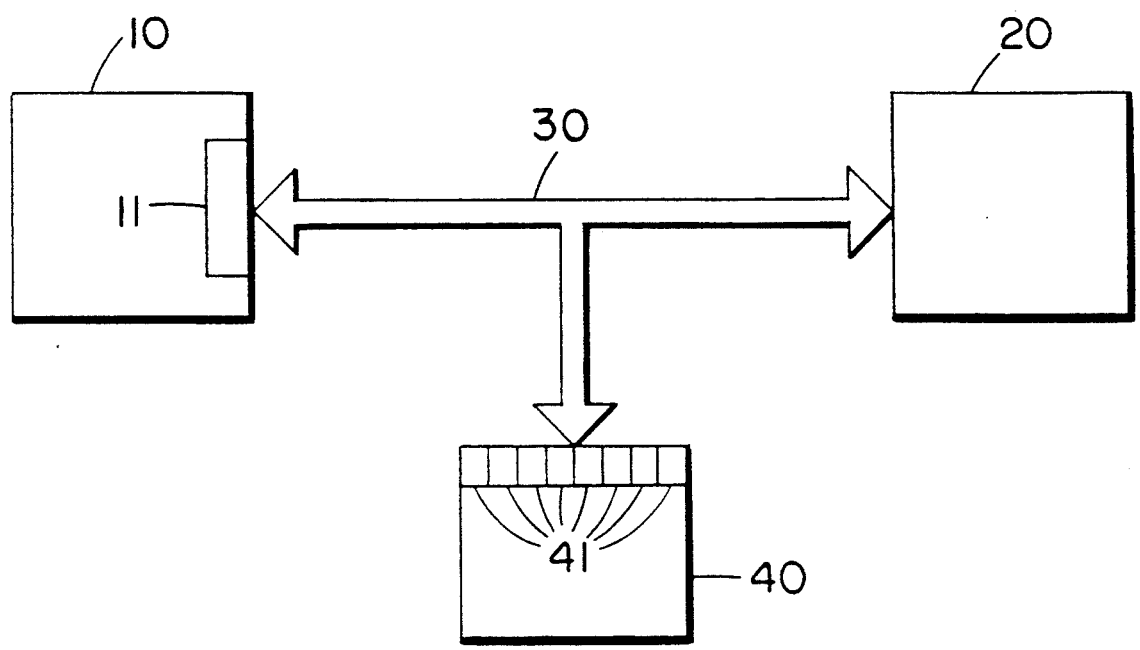
FIG. 1 is a block diagram of a computer system incorporating striping of the invention.

Referring now to the drawings, FIG. 1 shows a computer system generally indicated by reference numeral 1. The computer system 1 includes a central processor unit or "host" 10 having primary temporary data storage, such as memory 11, and secondary permanent data storage, such as disk device 20. The host 10 and disk device 20 are connected by a communication bus 30. The computer system 1 also includes a memory buffer cache (cache) 40, also connected to the system bus 30.

The host 10 is generally conventional, and is of the type that supports a multiple number of concurrent users executing a wide variety of computer applications, including database applications which use the disk device 20 for storing data. During operation of the computer system, the host 10 issues I/O requests, such as reads and writes, to transfer data between memory 11 and the disk device 20 via the bus 30 and cache 40.

The cache 40 allows the computer system 1 to take advantage of the principles of locality of reference. Presumably, the host 10 can access data stored in a semiconductor memory cache considerably faster than data stored on the disk drives 21–25. Data frequently used by the host 10 are retained in cache 40 for as long as possible to decrease the number of physical I/O requests to transfer data between the host 10 and the disk drives 21-25. The cache 40 is organized into a plurality of blocks 41 for storing data. Blocks 41 store either modified or "new" data to be written to the disk drives 21-25, or unmodified "old" data read from the disk drives 21-25.

Host 10 "logical" I/O write requests store the new data in the cache 40, and "physical" I/O write requests transfer the data from the cache 40 to the disk drives 21-25, generally some time thereafter. While the new data are stored in the cache 40, that is, before the new data are written to permanent storage on the disk drives 21-25, the new data are vulnerable to corruption due to, for example, power or system failures. For this reason, the cache 40 includes relatively expensive non-volatile memory. For some applications, for example, random access database applications, where the amount of data read (old data) is much larger than the amount of new data that is written, it may be advantageous to partition the cache 40 into a larger read cache and a smaller write cache. That portion of the cache 40 which is used for storing old data retrieved from the disk drives 21-25 can be less expensive volatile memory, since that data, in case of failure, can easily be restored from the disk drives 21-25.

For the purpose of illustration only, and not to limit generality, this invention will be described with reference to its use in the disk device 20 which is organized as a RAID device as described in the Patterson et al. paper. However, one skilled in the art will recognize that the principles of the invention may also be used in storage devices organized in different manners.

Figure 2:
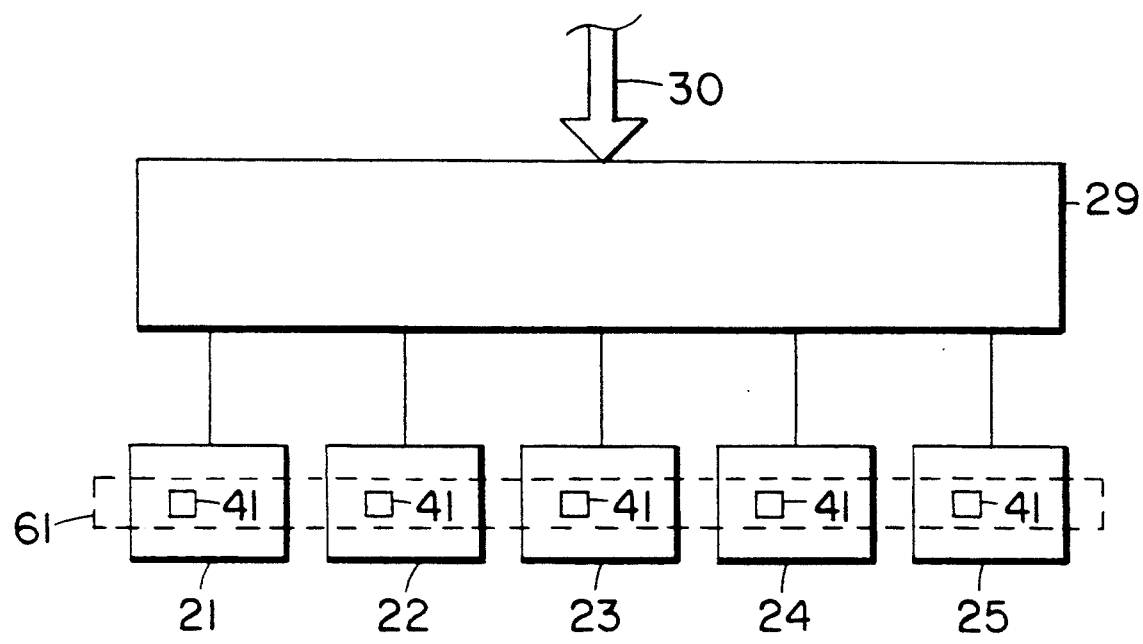
FIG. 2 is a block diagram of a RAID configuration incorporating striping of the invention.

FIG. 2 shows, in schematic block diagram form, a disk device 20 disk device 20 organized in the RAID level 5 fashion as described in the Patterson et al. paper. The disk device 20 comprises a controller 29 connected to the system bus 20, and a plurality of disk drives 21-25.

The storage space of the disk drives 21-25 is physically organized into, for example, sectors, tracks, and cylinders, heads. However, in order to simplify access by the host 10, the storage space of the disk drives 21-25 is also organized into a set of sequentially numbered blocks 41 compatible with the block structure of the cache 40, generally indicated with respect to disk drive 21, by reference numeral 41. By using sequentially numbered blocks 41, the details of the physical organization of the disk drives 21-25, for example, the number of sectors per track, the number of tracks per cylinder, and the physical distribution of all data across the drives 21-25, do not need to be known by the users of the host 10. In the preferred embodiment, a block 41 of data is equal to the minimal amount of data that can be conveniently transferred between the cache 40 and the disk drives 21-25 with a single I/O request, for example, a sector. Blocks 41 can also be larger, for example, an integral number of sectors.

To improve the I/O throughput of the disk device 20, the blocks 41 are further organized into yet larger sections of data, known as "stripes," generally indicated by reference numeral 61. Striping techniques are well known in RAID, and generally involve the concurrent reading and writing of data to several disk drives. With striping, a host I/O request distributes the data to be transferred across the disk drives 21-25. In the preferred embodiment, the stripe 61 is equal to the amount of data that is transferred when one block 41 is transferred for each of the disk drives 21-25 in parallel, for example five blocks 41.

RAID type devices, which include a large number of disk drives have a fairly high probability that one of the disk drives in the array will fail. Therefore, parity encoding is typically used to recover data that may be lost because of a disk drive failure. For example, one of the blocks 41 of the stripe 61, the "parity block" stores parity data generated from the other "data blocks" of the stripe. The parity data stored in the parity block is generated by using, for example, an exclusive OR (XOR) function.

Figure 3:
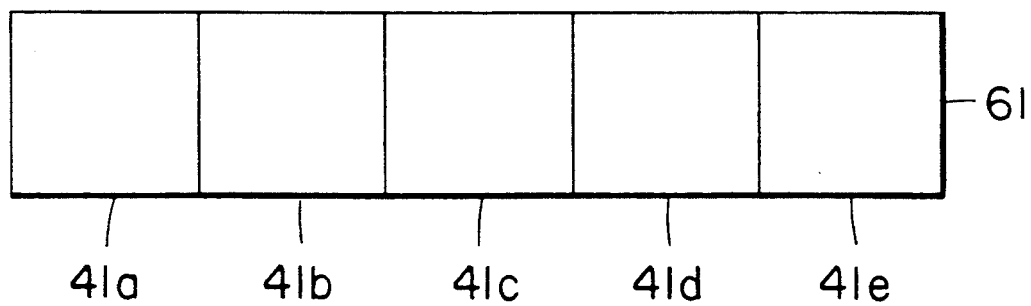
FIG. 3 is a block diagram of a stripe including data blocks and a parity block.

RAID level 5 parity protection suffers from the inherent problem that the number of I/O requests, read and writes, that must be serviced to write new data, including parity data, are many more than would be the case with non-RAID disks. For example, with reference to FIG. 3 showing a stripe 61 including data blocks 41a-41d and a parity block 41e, new parity could be generated as follows. Presume that block 41a stores new data to be written from the cache 40, and that the blocks 41b-41d, which contain old data, are not stored in the cache 40. A first technique that can be used for generating the parity data for the parity block 41e is to take the XOR of blocks 41a-41d. Therefore, three additional I/O requests would be required to read the three blocks 41b-41d from the disk drives 21-25, before the new parity data can be generated.

Alternatively, as a second technique, the same new parity data for the parity block 41e can also be generated as follows: reading from the disks 21-25 the old data block which is going to be replaced by the new data block 41a which is stored in cache 40; reading the old parity block which is going to be overwritten by the new parity block 41e; and generating the new parity data from the old data, the old parity data, and the new data. In other words, this second technique only requires two additional I/O requests.

However, in this example, if blocks 41b-41d were already stored in the cache 40, no additional I/O requests would be required if the first technique was used. Therefore, prior to writing a new data block, it would be an advantage to determine if the entire stripe 61 is stored in cache 40 to reduce the number of I/O requests. Even if not all of the blocks 41 of a stripe 61 are stored in the cache 40, partial stripe can reduce the number of I/O requests. For example, if the old parity block 41e were already stored in the cache 40, but blocks 41b-41d were not, then the second technique would only require one additional I/O request before parity data could be generated.

The purpose of entire and partial stripe detection, according to the invention, is to determine how to aggregate data in cache 40 sufficient to generate parity data with as few as possible I/O requests, thereby eliminating much of the latency associated with I/O requests. If the size of cache 40 is larger than the size of a stripe 61, there is an opportunity to eliminate a significant number of I/O requests due to stripe detection. If the amount of data stored in a stripe 61 is large, there is less probability that an entire stripe 61 will be present in cache 40. Even if the entire stripe 61 cannot be detected, detecting partial stripes 61, according to the invention, has significant benefits. Partial stripes 61 can be converted to entire stripes 61 by reading the missing data from the disk drives 21-25. The benefit in this case is not so large as when entire stripes 61 are detected, but partial stripe detection still provides a significant performance improvement. If the number of blocks 41 of a stripe 61 stored in cache 40 is small, it may require fewer I/O requests by generating the parity data from the individual blocks of the stripe as illustrated by the second technique above. The present invention provides a system for detecting entire and partial stripes 61, and furthermore, provides for parity generation with the minimal number of I/O requests.

In the preferred embodiment of the invention, the system determines the number of I/O requests required to generate the parity of a stripe 61 by using two different techniques. As a first alternative, the system determines how many I/O requests are required to aggregate in cache 40 all of the data blocks 41 of an entire stripe 61, and to generate the new parity data for the parity block 41 from all of the data blocks 41 of the entire stripe 61.

As a second alternative, the system determines how many I/O requests would be required to generate the parity data only from the individual data blocks 41 to be written and the old parity.

Whichever of the two alternative determinations produces the least number of I/O requests will be the optimal way for generating the parity data of a stripe 61.

Figure 4:
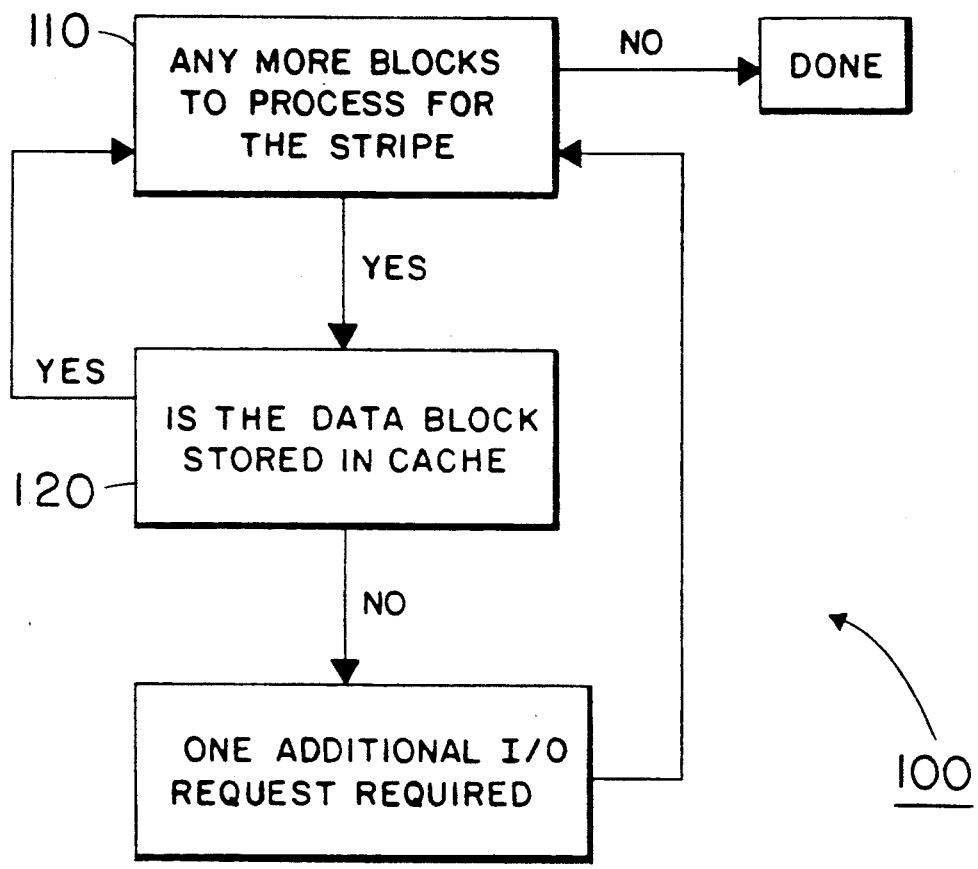
FIG. 4 is a flow chart of a first procedure used for stripe detection.

First with reference to FIG. 4, there is shown a flowchart of a procedure 100 for determining how many additional I/O requests would be required to generate a parity block for the entire stripe 61. Then referring to FIG. 5, there is shown a flow chart of a procedure 200 for determining how many I/O requests would be required to generate the parity data just from the individual blocks 41 to be written. Whichever of these alternative ways of writing a stripe 61 yields the least number of I/O requests will then be used to generate the parity of the stripe 61.

Now referring to FIG. 4, in procedure 100 beginning with step 110, for each of the data blocks of the stripe, the computer determines if there are any more data blocks to be processed for the stripe, if there are not, this procedure is done, otherwise, for the next data block data of the stripe, the computer determines if an additional I/O request is required to aggregate the data blocks of the stripe by proceeding with step 120.

In step 120, the computer determines if the data block is stored in the cache. If the answer in step 120 is yes, that is, the data block is in the cache, no additional I/O request is required, proceed with step 110. Otherwise, if the answer in step 120 is no, then one additional I/O request is required to read the data block into cache, proceed with step 110. Thus, the total number of additional I/O requests required for aggregating the data blocks of an entire stripe is determined. Note that this procedure does not need to aggregate into cache 40 the old parity data.

Figure 5:
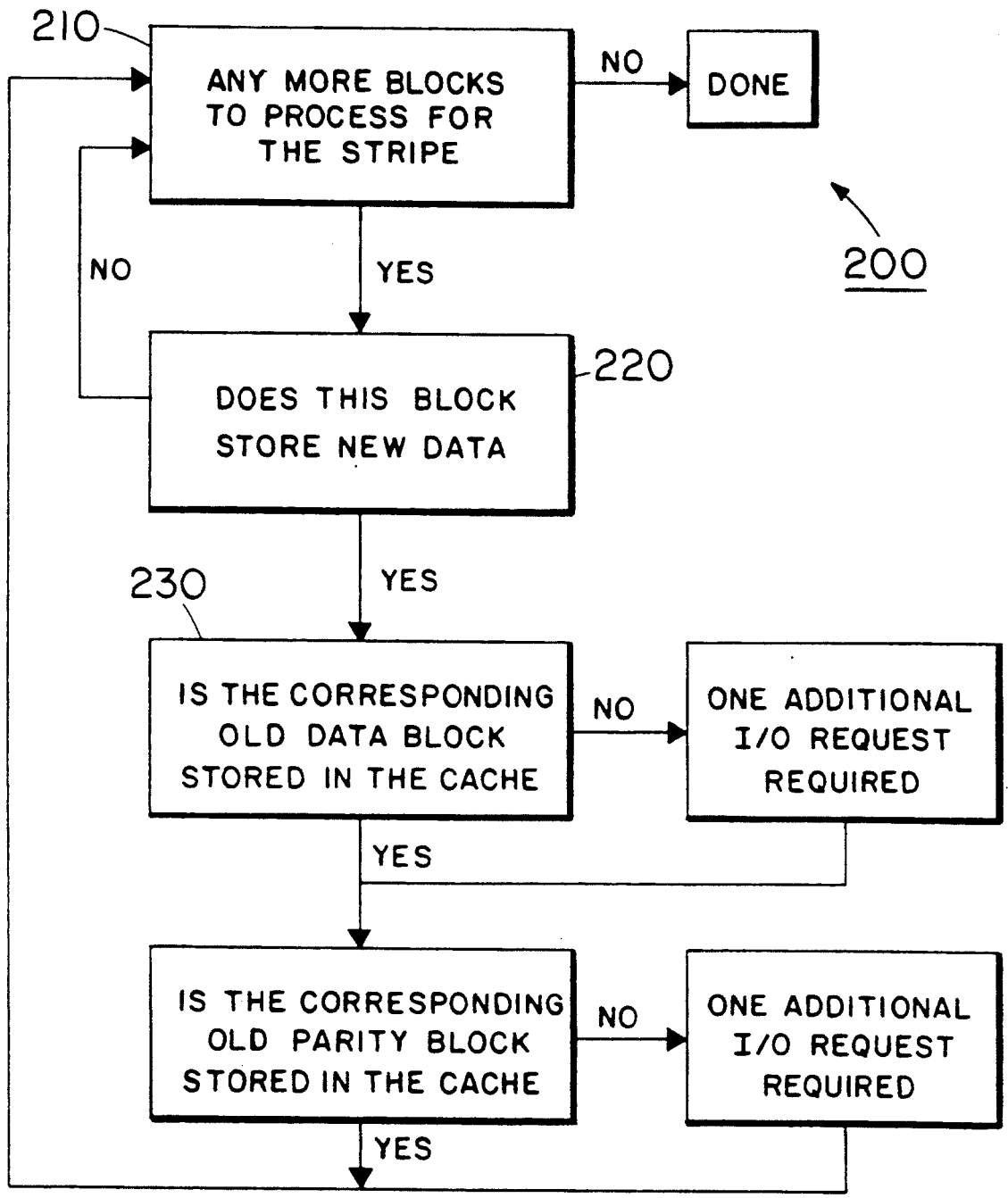
FIG. 5 is a flow chart of a second procedure used for stripe detection.

FIG. 5 shows the procedure 200 for determining the number of I/O requests to generate parity from the individual blocks of the stripe.

Beginning with step 210, for each of the data blocks of the stripe, the computer determines if there are any more data blocks to be processed for the stripe, if there are not, this procedure is done, otherwise for the next data block of the stripe, the computer determines if any additional I/O requests are required to aggregate the blocks necessary to generate parity data.

In step 220, the computer determines, if the data block of the stripe stores new data to be written to the disk drives 21-25. If the answer is no, that is, this data block of the stripe does not store new data, then no additional I/O requests are required, proceed with step 210.

In step 230, the computer determines if the old data block corresponding to the data block to be written is stored in the cache. If the answer is no, that is the old data block is not stored in cache, then one additional I/O request is required to read the old data block from the disk drives 21-25, in any case proceed with step 240.

In step 240, the computer determines if the old parity block of the stripe is stored in the cache. If the answer is no, that is the old parity block is not stored in the cache, then one more I/O request is required to read the old parity data from the disk drives 21-25, in any case proceed with step 210. The number of I/O requests for generating parity from the individual blocks of a stripe, as determined by procedure 200, are summed to give the total number of I/O requests that would be required to aggregate the data and parity blocks of a partial stripe.

After each of these two procedures 100 and 200 has been performed for the stripe, parity is generated according to the technique which yields the least number of I/O requests.

While there has been shown and described a preferred embodiment, it is understood that various other adaptations and modifications may be made within the spirit and scope of the invention.

What is claimed is:

1. An apparatus for generating parity data for a plurality of disk drives, each of the plurality of disk drives divided into a plurality of blocks, the plurality of blocks further organized into a plurality of stripes, each of the plurality of stripes including one block from each of the plurality of disk drives, one of the blocks of each stripe storing parity data generated from the data stored in the other blocks of the stripe, the apparatus comprising;

memory means for storing data, said memory means partitioned into blocks compatible with the block structure of the plurality of disk drives;

means for identifying an updated memory block storing data to be written to one of the plurality of disk drives;

means for identifying a predetermined stripe, said predetermined stripe including a disk block to be overwritten by said updated memory block;

first means for determining the number of I/O requests required to aggregate in said memory means all of the data, except the parity data, of said predetermined stripe;

second means for determining the number of I/O requests required to aggregate in said memory means said block to be overwritten and the parity block of said predetermined stripe; and means for choosing said first means OR said second means to perform said I/O requests by choosing the means which requires the fewest number of I/O requests to aggregate in said memory means the blocks of said identified stripe necessary to generate the parity data of said predetermined stripe.

2. The apparatus as in claim 1 wherein said memory means includes a non-volatile memory for storing data to be written to the plurality of the disk drives, and a volatile memory for storing data read from the plurality of disk drives.

3. The apparatus as in claim 1 wherein said first and second means include means for determining if the data of the disk blocks of said predetermined stripe are stored in said memory means as memory blocks.

4. The apparatus as in claim 1 including means for generating the parity data of said predetermined stripe from all of the data, except the parity data, of said predetermined stripe, and means for generating the parity data of said predetermined stripe from said updated memory block, said disk block to be overwritten, and said parity block of said predetermined stripe.

5. The apparatus as in claim 4 wherein said means for generating the parity data includes a means for performing an exclusive OR function.

6. A method for generating parity data for a plurality of disk drives, each of the plurality of disk drives divided into a plurality of blocks, the plurality of blocks further organized into a plurality of stripes, each of the plurality of stripes including one block from each of the plurality of disk drives, one of the blocks of each stripe storing parity data generated from the data stored in the other blocks of the stripe, the method comprising the steps of;

storing data in a memory means, said memory means partitioned into blocks compatible with the block structure of the plurality of disk drives;

identifying an updated memory block storing data to be written to one of the plurality of disk drives;

identifying a predetermined stripe, said predetermined stripe including a disk block to be overwritten by said updated memory block;

determining by a first means, the number of I/O requests required to aggregate in said memory means all of the data, except the parity data, of said predetermined stripe;

determining by a second means, the number of I/O requests required to aggregate in said memory means said block to be overwritten and the parity block of said predetermined stripe; and aggregating in said memory means the blocks of said identified stripe necessary to generate the parity data of said predetermined stripe with the fewest number of I/O requests as determined by said second OR said first means.

7. The method as in claim 6 wherein said memory means includes the step of storing data to be written to the plurality of the disk drives in a non-volatile memory, and storing data read from the plurality of disk drives in a volatile memory.

8. The method as in claim 6 further including the step of determining if the data of the disk blocks of said predetermined stripe are stored in said memory means as memory blocks.

9. The method as in claim 6 including the step of generating the parity data of said predetermined stripe from all of the data, except the parity data, of said predetermined stripe, OR generating the parity data of said predetermined stripe from said updated memory block, said disk block to be overwritten, and said parity block of said predetermined stripe, generating the parity data according to the step which requires the fewest I/O requests.

10. The method as in claim 6 further includes the step of generating the parity data by means of an exclusive OR function.

* * * * *